(12) United States Patent
Krisl et al.

(10) Patent No.: US 7,997,404 B2
(45) Date of Patent: Aug. 16, 2011

(54) CONVEYOR BELT WITH INTERMODULAR SUPPORTED SPHERES

(75) Inventors: Michal Krisl, Singapore (SG); Dieter Guldenfels, Pfeffingen (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 12/434,845

(22) Filed: May 4, 2009

(65) Prior Publication Data
US 2009/0250321 A1 Oct. 8, 2009

Related U.S. Application Data

(63) Continuation-in-part of application No. 11/592,617, filed on Nov. 3, 2006, now Pat. No. 7,527,143.

(51) Int. Cl.
*B65G 17/24* (2006.01)
(52) U.S. Cl. .................................. 198/779; 198/853
(58) Field of Classification Search .............. 198/850, 198/853, 370.09, 371.3, 779
See application file for complete search history.

(56) References Cited

U.S. PATENT DOCUMENTS

| | | | | |
|---|---|---|---|---|
| 6,367,616 | B1 * | 4/2002 | Lapeyre et al. | 198/779 |
| 6,997,306 | B2 * | 2/2006 | Sofranec et al. | 198/779 |
| 7,137,505 | B2 * | 11/2006 | Stebnicki et al. | 198/850 |
| 7,246,700 | B2 * | 7/2007 | Stebnicki et al. | 198/853 |
| 7,364,038 | B2 * | 4/2008 | Damkjaer | 198/853 |
| 7,556,136 | B2 * | 7/2009 | Marshall et al. | 198/370.09 |
| 2002/0020609 | A1 * | 2/2002 | Lapeyre et al. | 198/779 |

* cited by examiner

*Primary Examiner* — James R Bidwell
(74) *Attorney, Agent, or Firm* — Hodgson Russ LLP

(57) ABSTRACT

A series of rows of belt modules wherein a first one of the rows may have a plurality of hinge elements along an end of the first row. A second one of the rows may have a plurality of hinge elements along an end of the second row. The plurality of hinge elements of the first row may be interleaved with the plurality of hinge elements of the second row. A pivot rod may extend through the plurality of hinge elements of both the first row and the second row so as to pivotally join the first row to the second row. A sphere may be supported from a first module of the first row and supported from a second module of the first row, so that the sphere resides between the first module and the second module and so that the sphere extends above the modules in order to allow an object, which is to be conveyed by the conveyor belt, to be supported on the sphere. The modules may be moved in a belt travel direction in order to convey the object from a first location to a second location.

15 Claims, 12 Drawing Sheets

CONVEYOR BELT WITH INTERMODULAR SUPPORTED SPHERES

CROSS-REFERENCE TO RELATED APPLICATION

The present application is a continuation-in-part of U.S. patent application Ser. No. 11/592,617, filed Nov. 3, 2006 and entitled "Conveyor Belt with Intermodular Supported Rollers."

FIELD OF THE INVENTION

The present invention relates to conveyor belts for moving objects from one location to another location.

BACKGROUND OF THE INVENTION

The invention relates to power-driven conveyors and, more particularly, to modular conveyor belts constructed of rows of belt modules hingedly interlinked end-to-end by hinge pins.

Conventional modular conveyor belts and chains are made up of modular links, or belt modules, arranged in rows. Spaced apart link ends extending from each end of the modules include aligned apertures. The link ends along one end of a row of modules are interleaved with the link ends of an adjacent row. A pivot rod, or hinge pin, journalled in the aligned apertures of the end-to-end-connected rows, connects adjacent rows together to form an endless conveyor belt capable of articulating about a drive sprocket.

In many industrial applications, articles are allowed to accumulate on a continuously moving conveyor belt before being off-loaded. Friction between the conveying surface of the moving belt and the accumulated articles causes the articles to push against each other increasing backline pressure. Backline pressure can cause damage to the articles, excessively load the conveyor belt and its drive components, and accelerate belt wear. Rotatable elements, such as rollers, in rolling contact with the undersides of conveyed articles have been used to reduce friction and lower backline pressure.

In other conveyor applications, articles must be pushed off the side of a constantly moving or stop-and-go conveyor belt. Rollers oriented with their axes of rotation in the direction of belt travel have been used to provide low friction rolling contact with the undersides of conveyed articles being pushed off the side of a conveyor.

One shortcoming of roller-top belts is that they are difficult to clean owing to the many surfaces and nooks and crannies associated with the rollers. Cleanability is especially important in some industries, such as meat-handling, where bacteria can form in and spread from difficult-to-clean areas.

Another shortcoming of many low backline pressure conveyors is the placement of a roller on the pivot rod. Such a placement requires fewer or thinner link ends resulting in less belt pull strength or narrow rollers resulting in high contact pressure on conveyed articles. Thus, there is a need for a modular conveyor belt that features low backline pressure or low-friction side transfer and that is easy to clean.

SUMMARY OF THE INVENTION

The present invention may include a series of rows of belt modules. A first one of the rows may have a plurality of hinge elements along an end of the first row. A second one of the rows may have a plurality of hinge elements along an end of the second row. The plurality of hinge elements of the first row may be interleaved with the plurality of hinge elements of the second row. A hinge pin may extend through the plurality of hinge elements of both the first row and the second row so as to pivotally join the first row to the second row.

A roller may be supported from a first module of the first row and supported from a second module of the first row, so that the roller resides between the first module and the second module and so that the roller extends above the modules in order to allow an object, which is to be conveyed by the conveyor belt, to be supported on the roller. An axle may extend through the roller. The axle may have a first end supported by the first module and a second end supported by the second module.

In an alternate embodiment, the rollers may be positioned in such a way that they extend through the top as well as the bottom side of the belt. This arrangement is designed to drive the rollers on the bottom side of the belt, either by moving the belt with the rollers over a stationary support plate or by moving it over a driving flat belt that can accelerate the rollers forward or backward and at various speeds.

In another alternate embodiment, the rollers are replaced with spheres.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1A:
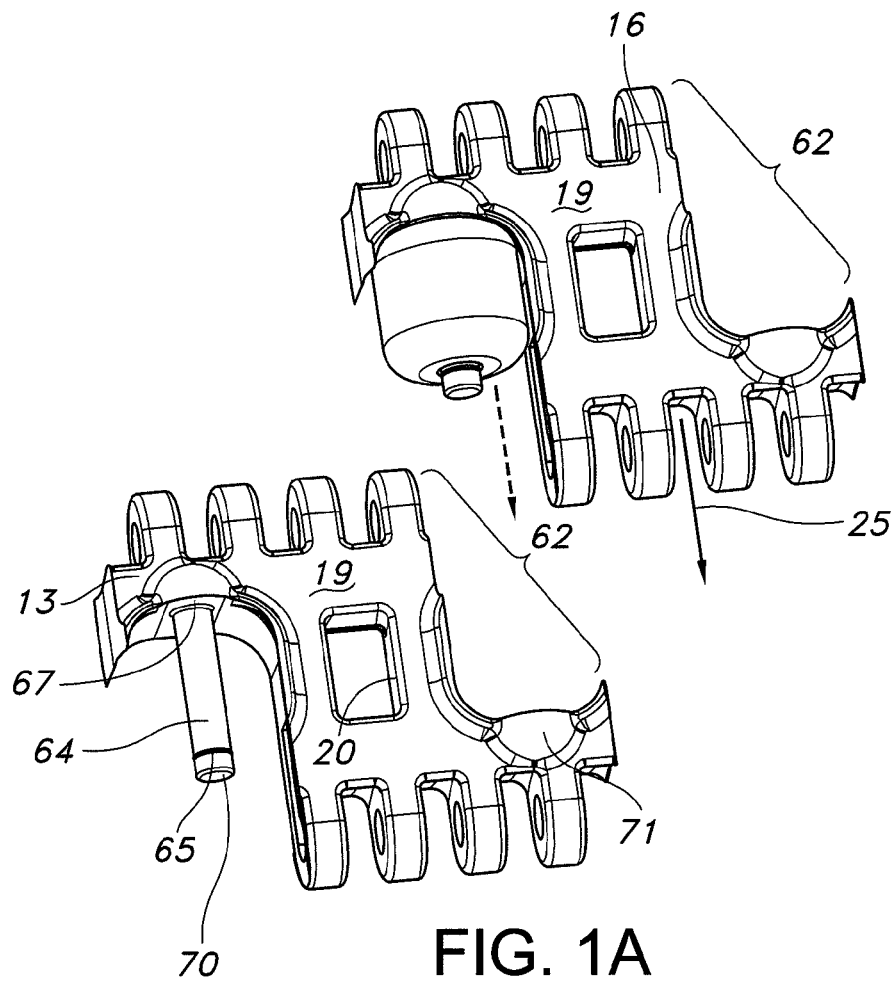
FIG. 1A, which is a perspective view of a pair of middle modules according to the present invention prior to assembly.
Figure 1B:
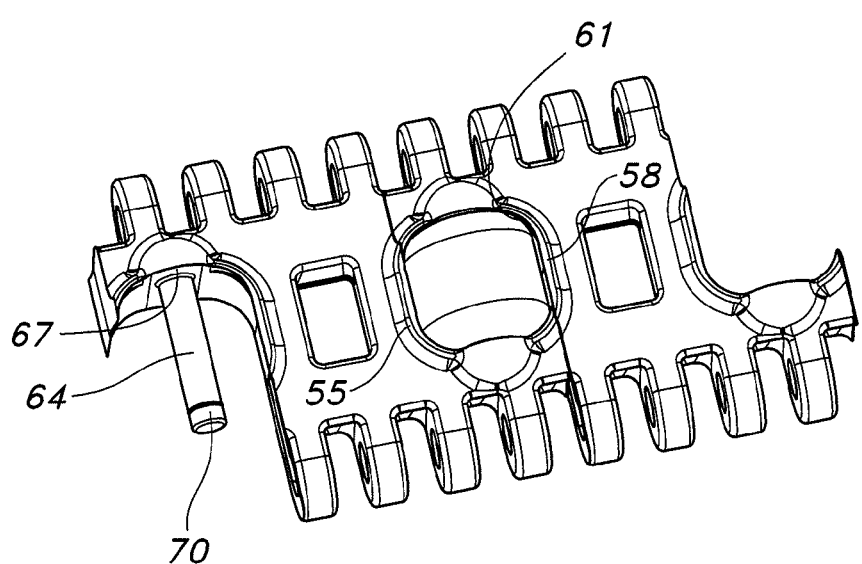
FIG. 1B, which is a perspective view of two modules with the roller assembled.
Figure 2A:
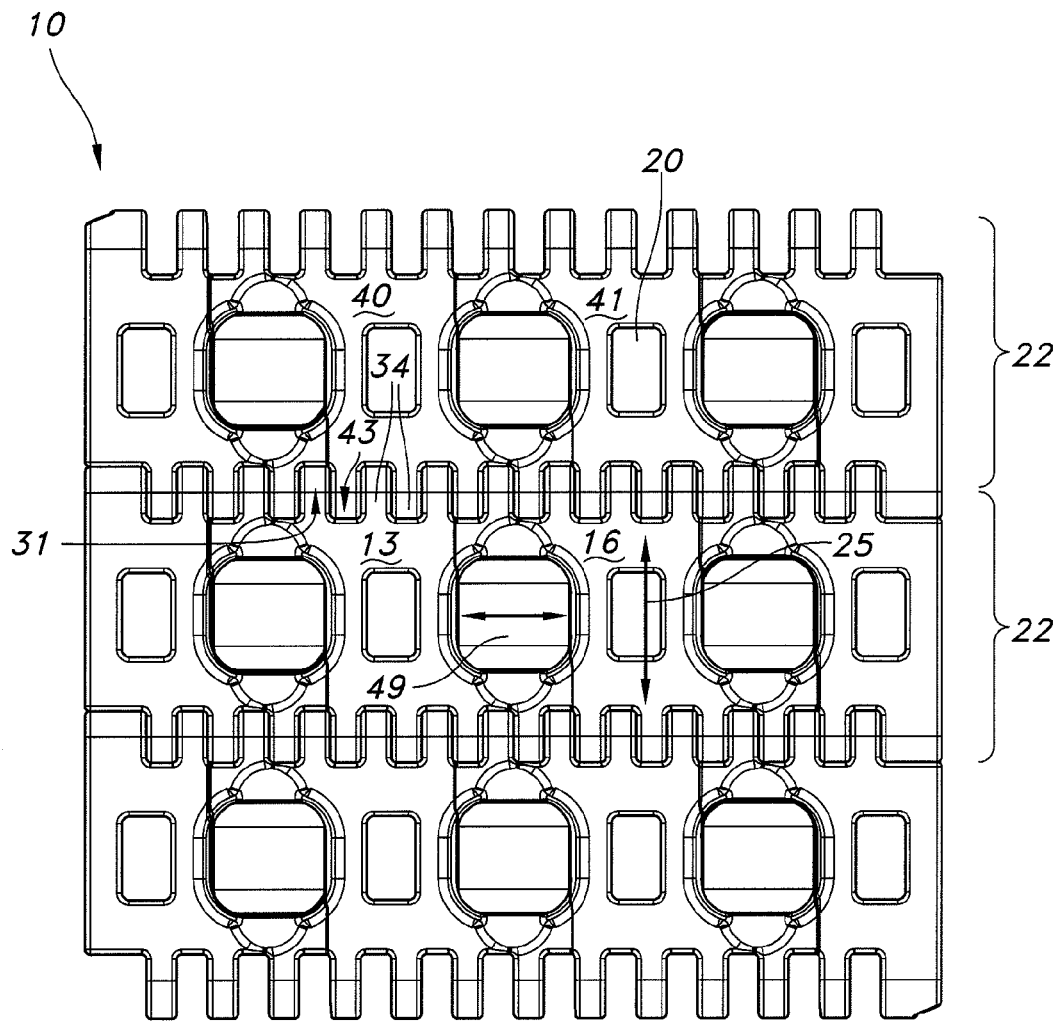
FIG. 2A, which is a plan view of a belt formed according to the present invention.

Referring generally to FIGS. 1A-12 and initially to FIG. 1A, a first module 13 and a second module 16 are shown prior to assembly within a row 22 (FIG. 2A) of a modular belt 10 (FIG. 2A). Each module 13, 16 may have a conveying surface 19. The second module 16 may be placed adjacent to the first module 13. The first module 13 and the second module 16 may be arranged in a row 22 of modules, the row 22 being oriented substantially perpendicular to a direction of belt travel indicated by arrow 25 (FIG. 2A) to extend across the conveyor belt 10. The modules 13, 16 may be moved in order to convey an object 28 (FIG. 6B) from a first location to a second location.

Turning to FIG. 2A, modules 13, 16 may be joined to form a portion of the belt 10. The belt 10 has openings 20 that can be engaged by teeth on a sprocket (not shown) to impart motion to the belt as will be understood by those skilled in the art based on this disclosure. The first module 13 may have a first end 31 that includes a plurality of link ends 34. Each link end 34 may have a transverse pivot rod opening 37 (FIG. 2B) therethrough. A juxtaposed module 40 may also have an end 43 that includes a plurality of link ends 34, each with a transverse pivot rod opening 37 therethrough. A pivot rod 46 (FIG. 2B) may extend through the openings 37 in order to form a hinge. In this manner, the juxtaposed module 40 may be pivotally joined to the first module 13. In the bricklayed arrangement shown in FIG. 2A, the second module 16 may also receive the pivot rod 46, and thereby pivotally join the second module 16 to the juxtaposed module 40. As shown in FIG. 2A, the second module 16 is also joined to a fourth module 41 that is in the same row as the juxtaposed module 40.

The conveyor belt 10 may further have a roller 49 supported from the first module 13 and from the second module 16. The roller 49 may extend beyond the conveying surfaces 19 in order to allow the object 28 to be supported by the roller 49. The roller 49 may have a substantially cylindrical contact surface 52 (see FIG. 2B), for contacting the object 28 being carried by the conveyor belt 10.

Returning to FIG. 1A, the first module 13 and the second module 16 have one or more substantially "L" shaped edges 62. When positioned next to a different module, a cavity 61 (FIG. 1B) may be formed, and part of the roller 49 may reside in the cavity 61. FIG. 1B depicts how an "L" shaped edge 62 of the first module 13 and an "L" shaped edge 62 of the second module 16 may define the cavity 61. An edge 55 may comprise a portion of the "L" shaped edge 62 corresponding to the first module 13. An edge 58 may comprise at least a portion of the "L" shaped edge 62 corresponding to the second module 16.

An axle 64 may extend through the roller 49. The axle 64 has a first end 67 and a second end 70. The axle 64 may be integrally molded as part of the modules and extending therefrom. The axle 64 may include a retaining ring 65 having a diameter that is greater than the diameter of the axle 64. Accordingly, the roller 49 can be preassembled onto the axle 49 prior to assembling the modules 13, 16 into a belt 10. With the integrally formed axle 64, the second end 70 is received in a hole 76 (FIGS. 8 and 8B) in the adjacent module. The modules 13, 16 may also be provided with a thickened portion 71 on opposite sides of the roller 49 so as to protect the roller 49 from side impacts during use. As shown in FIG. 1A, the roller 49 is mounted on axle 64 extending from the left hand side of module 16. The second end 70 is received in the opening in module 13 when the modules are assembled as shown in FIG. 1B.

Figure 2B:
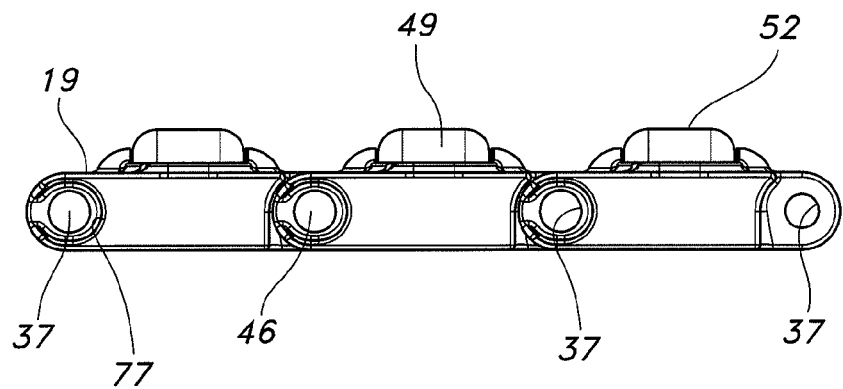
FIG. 2B, which is a side elevational view of the belt of FIG. 2A.

As shown in FIG. 2B, the rollers 49 extend above the conveying surface 19 of the belt 10. The end modules of the belt 10 include a recess 77 for rod retaining as will be evident to those of ordinary skill in the art based on this disclosure.

Figure 2C:
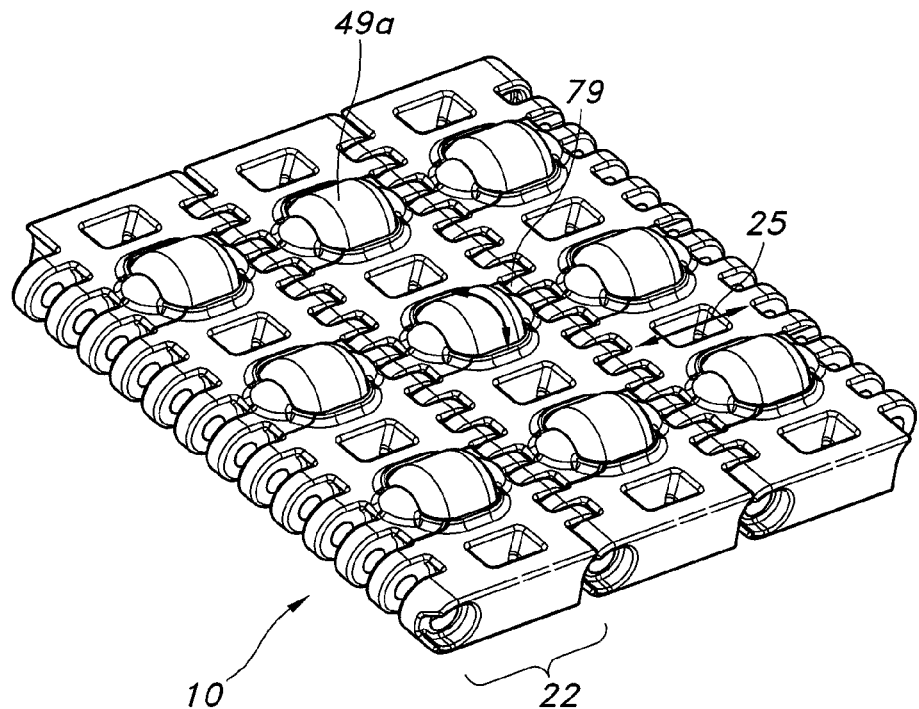
FIG. 2C, which is a perspective view of the belt of FIG. 2A.

FIG. 2C depicts one possible orientation of the rollers 49. The roller 49a has an axis 79 of rotation oriented substantially perpendicular or transverse to a direction of belt travel 25.

Figure 3:
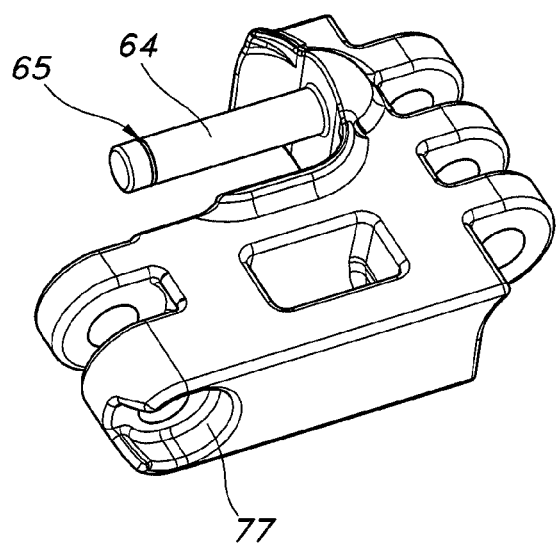
FIG. 3, which is a perspective view of an edge module having an axle oriented for a transversal roller.

FIG. 3 shows an end module with a recess 77 for rod retention as will be evident to those of ordinary skill in the art based on this disclosure. The axle 64 is positioned to receive a transverse roller 49a. Retaining ring 65 provides for pre-assembling the rollers 49a to the axles 64.

Figure 4A:
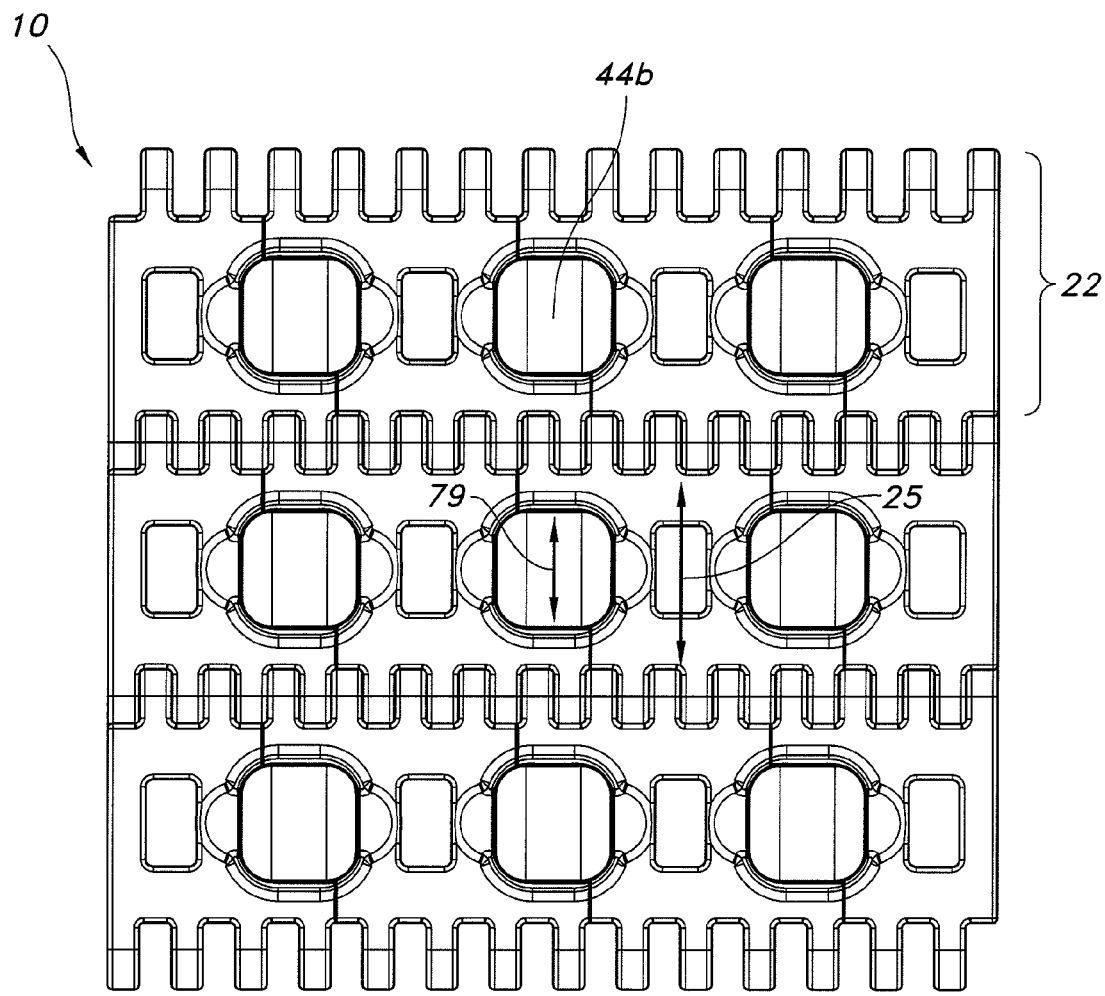
FIG. 4A, which is a plan view of an alternative embodiment of the present invention having longitudinal rollers.
Figure 4B:
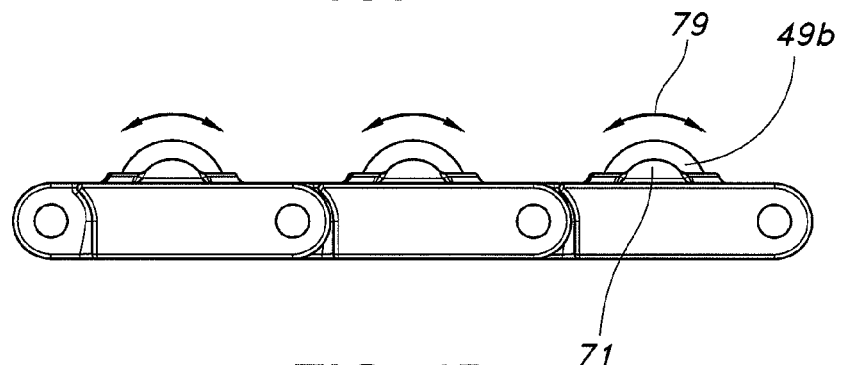
FIG. 4B, which is a side elevational view of the belt shown in FIG. 4A.
Figure 6A:
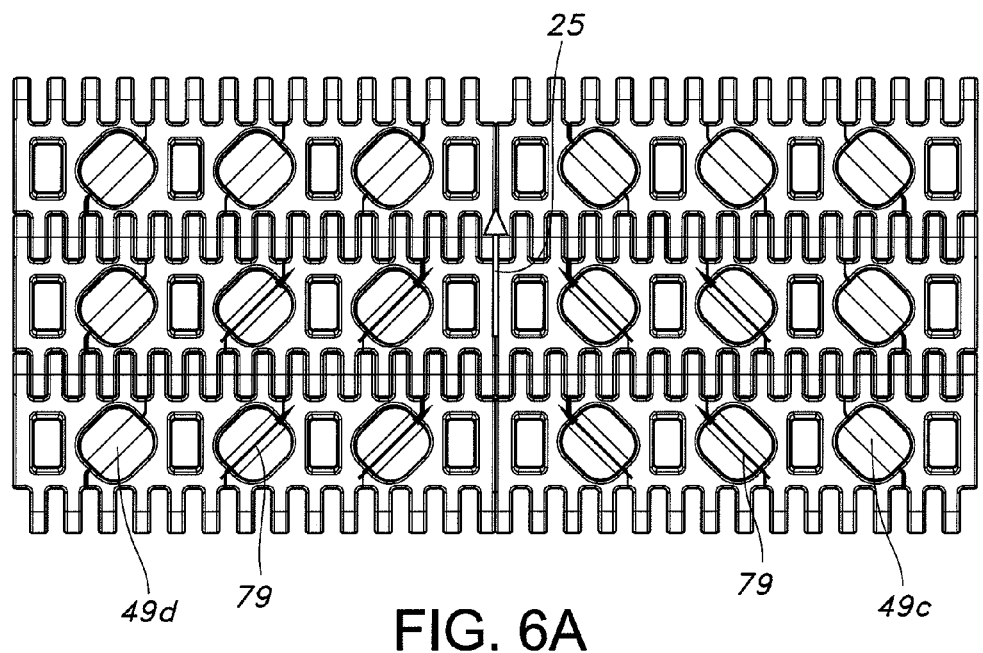
FIG. 6A, which is a plan view of a belt according to another embodiment of the invention.

In FIGS. 4A and 4B, roller 49b has an axis 79 of rotation that is substantially parallel to a direction of belt travel 25. In FIG. 6A, the roller 49c has an axis 79 of rotation that is oriented in a direction that is not perpendicular or parallel to a direction of belt travel 25. With such a belt 10, a force may be applied to an object 28 to cause the rollers 49 to rotate, and thereby allow the object 28 to move relative to the belt 10 in a desired direction.

Figure 5A:
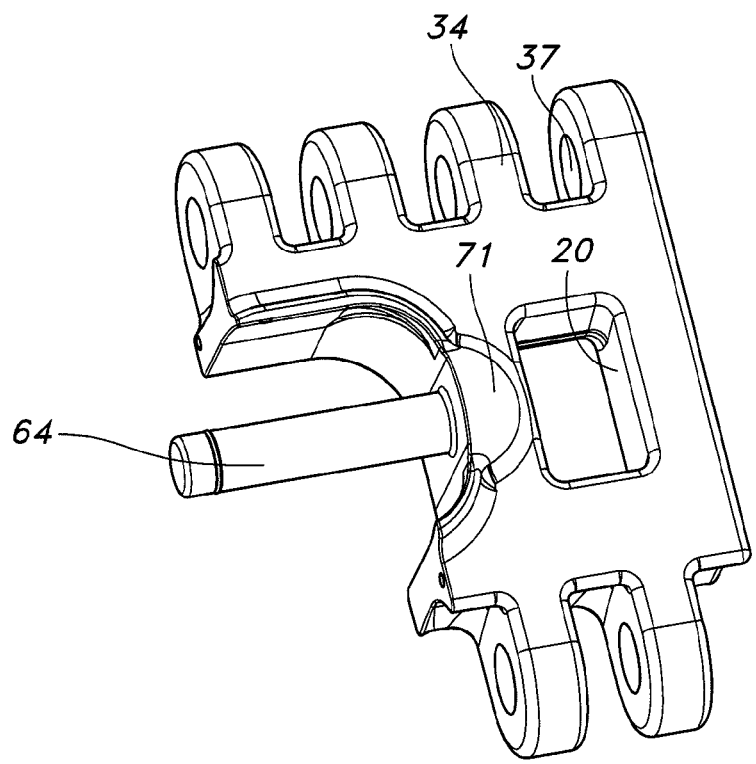
FIG. 5A, which is a perspective view of an edge module with an axle positioned for a longitudinal roller.
Figure 5B:
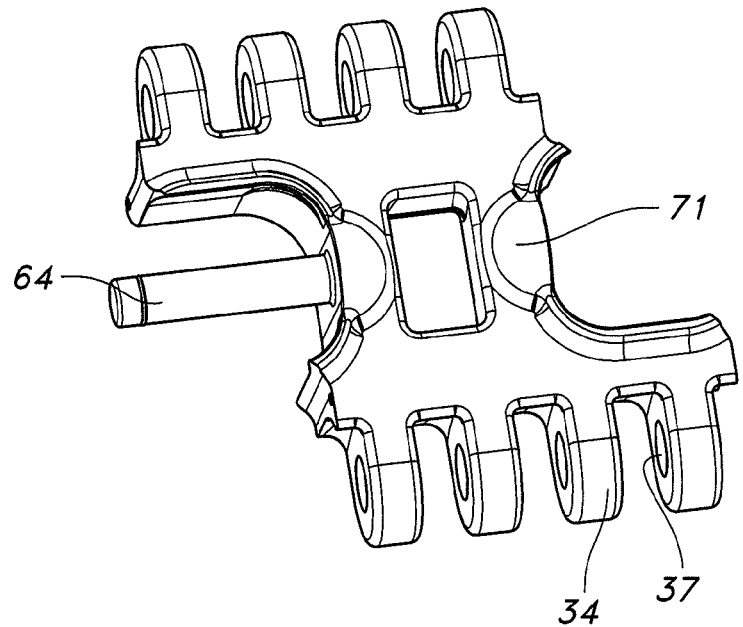
FIG. 5B, which is a perspective view of a middle module with an axle positioned for a longitudinal roller.

FIGS. 5A and 5B show an edge module and a middle module respectively. The axle 64 is positioned so as to provide for support of a longitudinal roller 49b with an axis of rotation 79 parallel to the direction of belt travel.

Turning to FIG. 6A, there is shown a belt 10 in which there are two orientations of the rollers 49. The rollers 49c have an axis 79 of rotation that is disposed at an angle of approximately 45 degrees to the belt travel direction 25. The rollers 49d have an axis 79 of rotation that is approximately equal and opposite to the angle for rollers 49c.

Figure 6B:
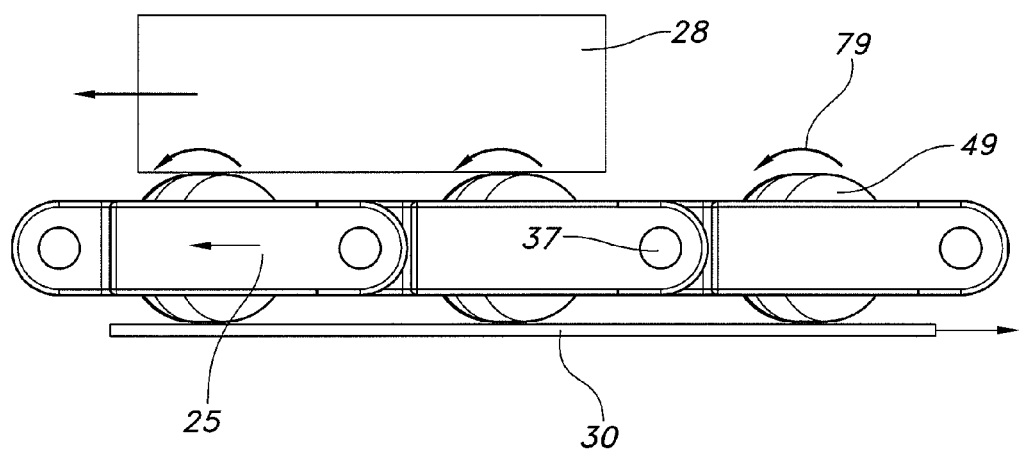
FIG. 6B, which is a side elevational view of a belt having active rollers.

FIG. 6B shows a belt 10 with active rollers 49c. The rollers 49c extend above the conveying surface 19 and extend below the bottom surface 29 of the belt 10. This arrangement is designed to drive rollers on the bottom side of the belt 10, either by moving the belt 10 over a stationary plate (not shown) or by moving it over a driving flat belt 30 which can accelerate the rollers forward or backward and at various speeds. The purpose of such operations is the centering of the goods on the middle of the belt or alternatively discharge of the goods sideways from the belt. It is also possible to have longitudinal or transverse rollers that extend above and below the belt 10.

Figure 7A:
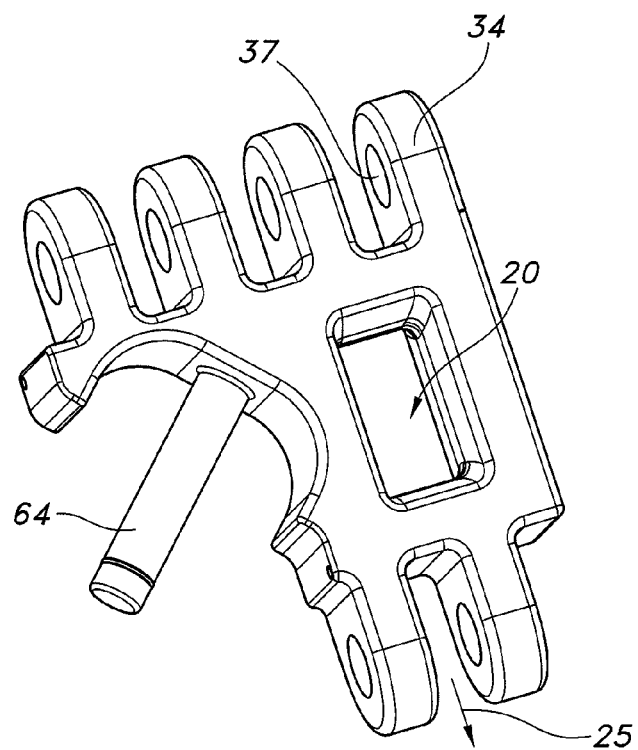
FIG. 7A, which is a perspective view of an edge module having an axle disposed at approximately forty-five degrees with respect to the direction of belt travel.
Figure 7B:
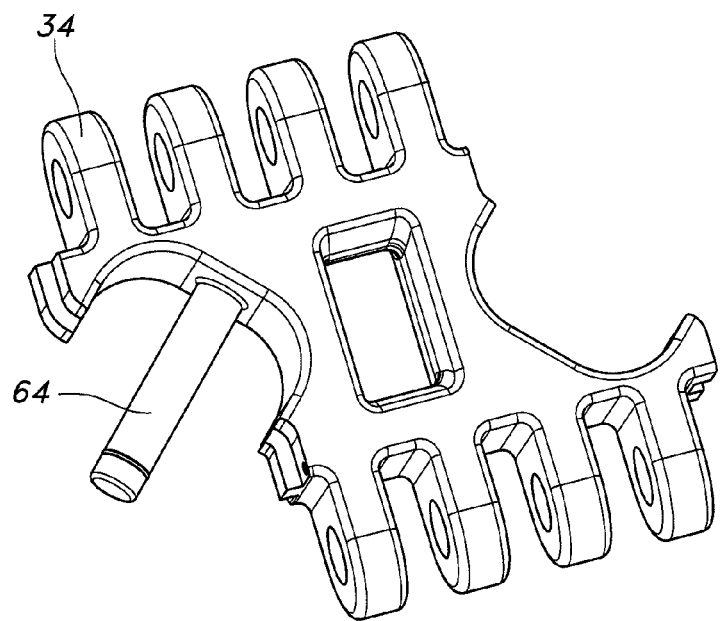
FIG. 7B, which is a perspective view of a middle module having an axle disposed at an approximately forty-five degree angle with respect to the direction of belt travel.

Turning to FIGS. 7A and 7B, an edge module and a middle module respectively are shown. The modules have an axle 64 oriented at an angle to provide support for rollers disposed at an angle of approximately forty-five degrees with respect to the direction of belt travel indicated by arrow 25.

Figure 8A:
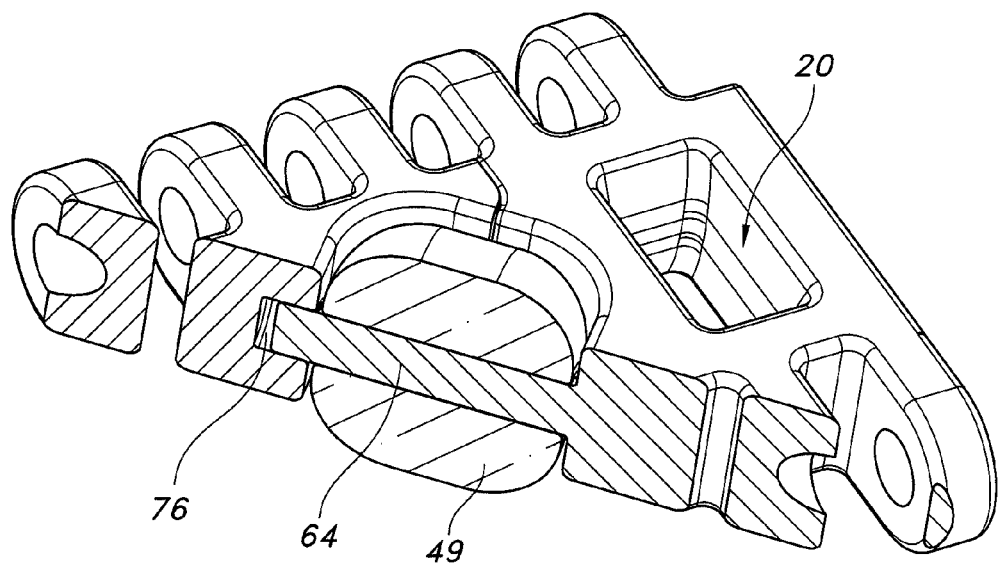
FIG. 8A, which is a cross-sectional view of a pair of assembled modules.
Figure 8B:
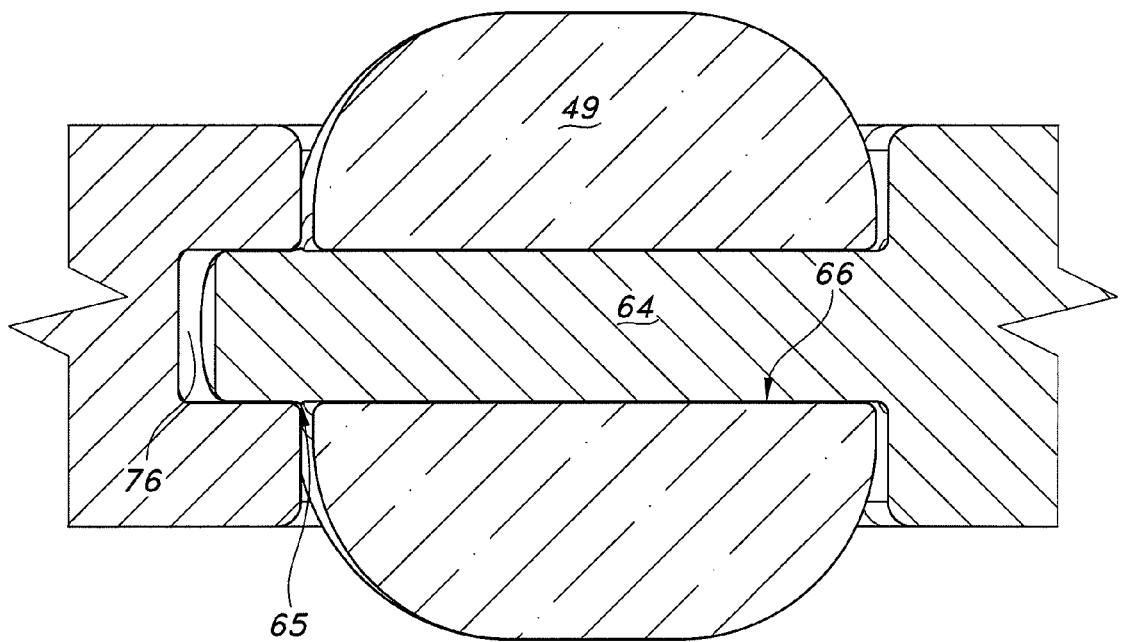
FIG. 8B, which is an enlarged cross-sectional view taken from FIG. 8A.
Figure 9:
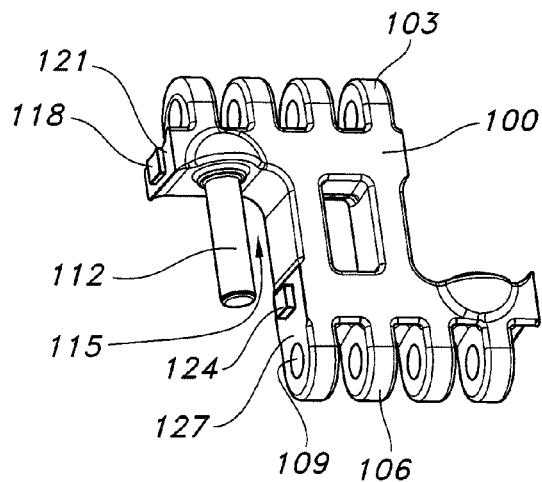
FIG. 9, which is a perspective view of an alternate embodiment of the module of the present invention.

FIGS. 8A and 8B depict a roller 49 that may be used with the invention. The roller 49 depicted in FIG. 8B has an axle 64 that is integrally formed with and extends from the modules of FIG. 1A. The axle 64 has a retaining ring 65 disposed thereon. The retaining ring 65 has a diameter that is larger than the outside diameter of the axle 64. The diameter of the retaining ring 65 is slightly larger than the inside diameter of the bore 66 inside the roller 49. Accordingly, the roller 49 can be preassembled onto the axle 64 by sliding the roller 49 onto the axle 64 until the bore 66 in the roller 49 clears the retaining ring 65.

Turning to FIGS. 9-12, an alternate embodiment of the present invention is shown. Module 100 has a first plurality of link ends 103 extending in a first direction and a second plurality of link ends 106 extending in a second direction opposite the first direction. The first and second link ends 103, 106 are offset such that the first link ends 103 of a first module 100 are capable of intercalating in the spaces between the second link ends 106 on an adjacent module. The link ends 103, 106 have a plurality of transverse openings 109 capable of aligning when adjacent modules are intercalated. A pivot rod (not shown) may be inserted through the aligned openings 109 to form a hinge between rows of modules 100. On the left hand side of FIG. 9, an axle 112 extends inside an L-shaped opening 115 formed in the module 100. A protuberance 118 extends from an end wall 121 of module 100. Another protuberance 124 extends from a wall 127 bordering the L-shaped opening 115.

Figure 10:
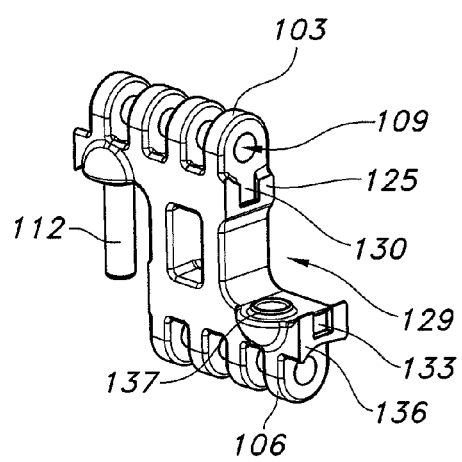
FIG. 10, which is a perspective view of an alternate embodiment of the module of the present invention.

Turning to FIG. 10, the right hand side of the module 100 has recesses 130 and 133 that correspond to the protuberances 118 and 124. Recess 130 is disposed on a portion of the wall 125 that defines the second L-shaped opening 129 on the module 100 and is sized to receive the protuberance 118. Recess 133 is disposed on end wall 136 positioned at the right hand side of the module 100. Recess 133 is sized to receive protuberance 124. An opening 137 is sized to receive the distal end of the axle 112.

Figure 11:
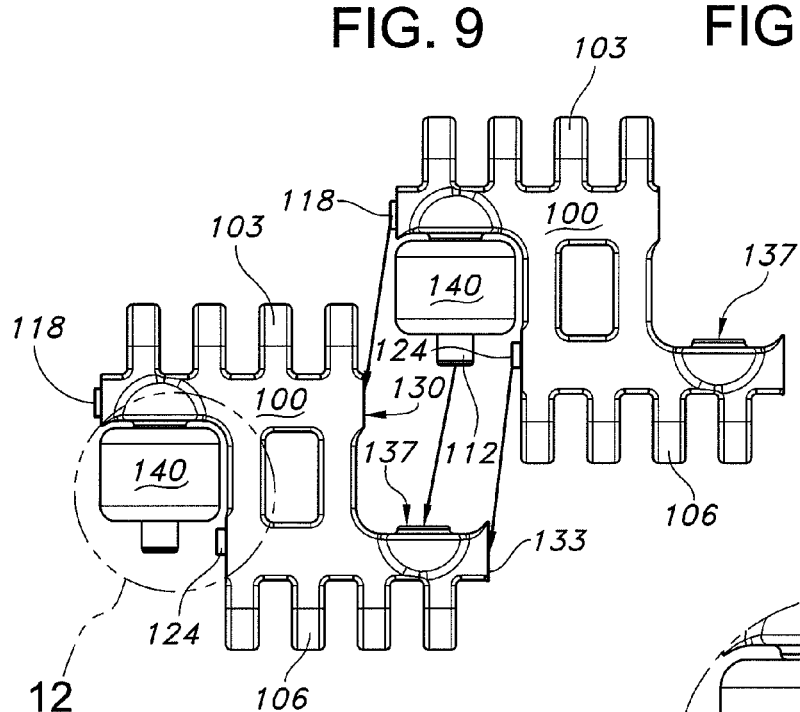
FIG. 11, which is a top plan view of a pair of adjacent modules with rollers installed.
Figure 12:
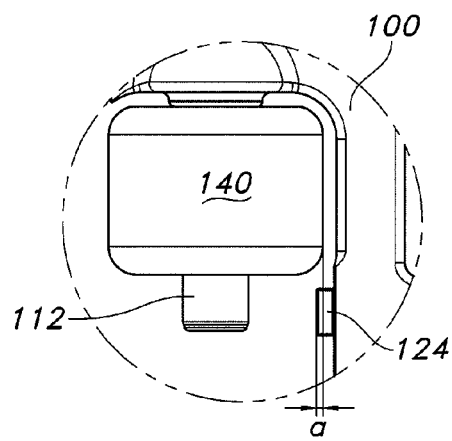
FIG. 12, which is a detailed view of a portion of one of the modules shown in FIG. 11.

In FIG. 11, a pair of modules 100 are shown in side-by-side relation prior to installation. As shown, the protuberance 118 on the module 100 on the right side of the figure slides into the recess 130 on the module 100 on the left hand side of the figure. Also, protuberance 124 on the module 100 on the right hand side of the figure slides into recess 133 on module 100 on the left hand side of the figure. The engagement of the protuberances 118, 124 with the recesses 130, 133 provides for alignment of the adjacent modules 100. The protuberance 124 provides an additional function as it extends slightly beyond the edge of a roller 140 when the roller 140 is installed in the module as shown in FIGS. 11 and 12. The roller 140 can be pre-installed on a module 100 by sliding it onto the axle 112. The width of the roller 140 is designed so that it is capable of being forced onto the axle 112 by sliding it past the protuberance 124. However, once the roller 140 is inserted onto the axle 112 it is obstructed from sliding off of the axle 112 by protuberance 124. The roller 140 extends beyond the protuberance 124 by a distance a as best shown in FIG. 12.

Figure 14:
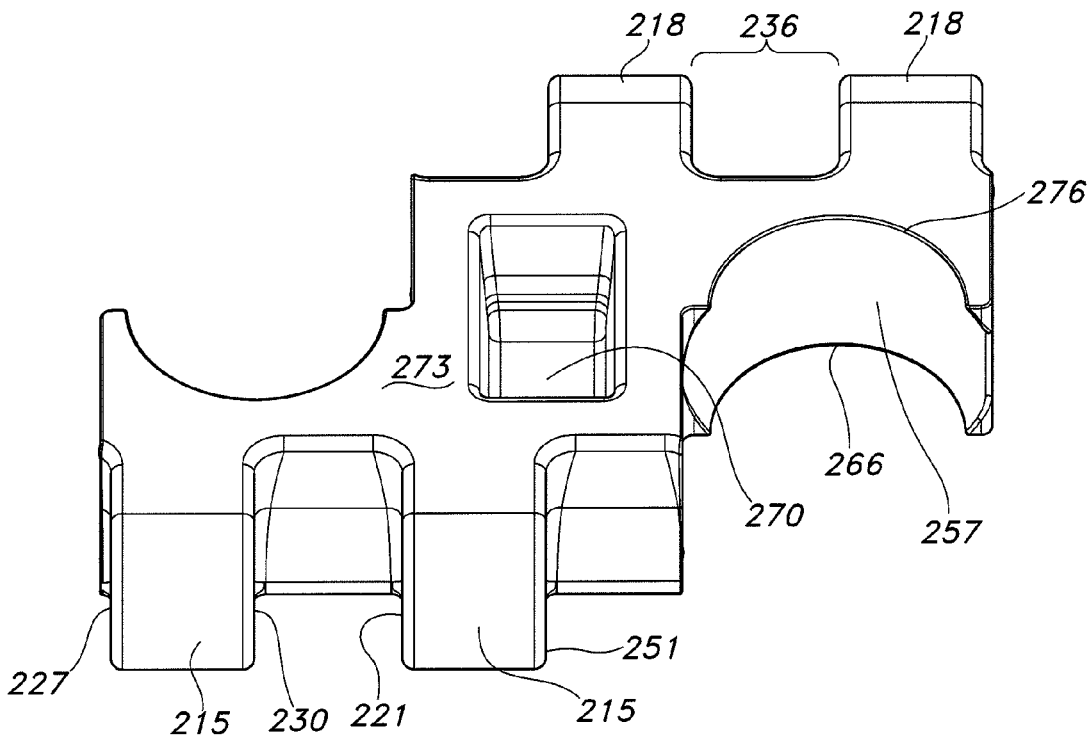
FIG. 14, which is a bottom perspective view of the module shown in FIG. 13.
Figure 13:
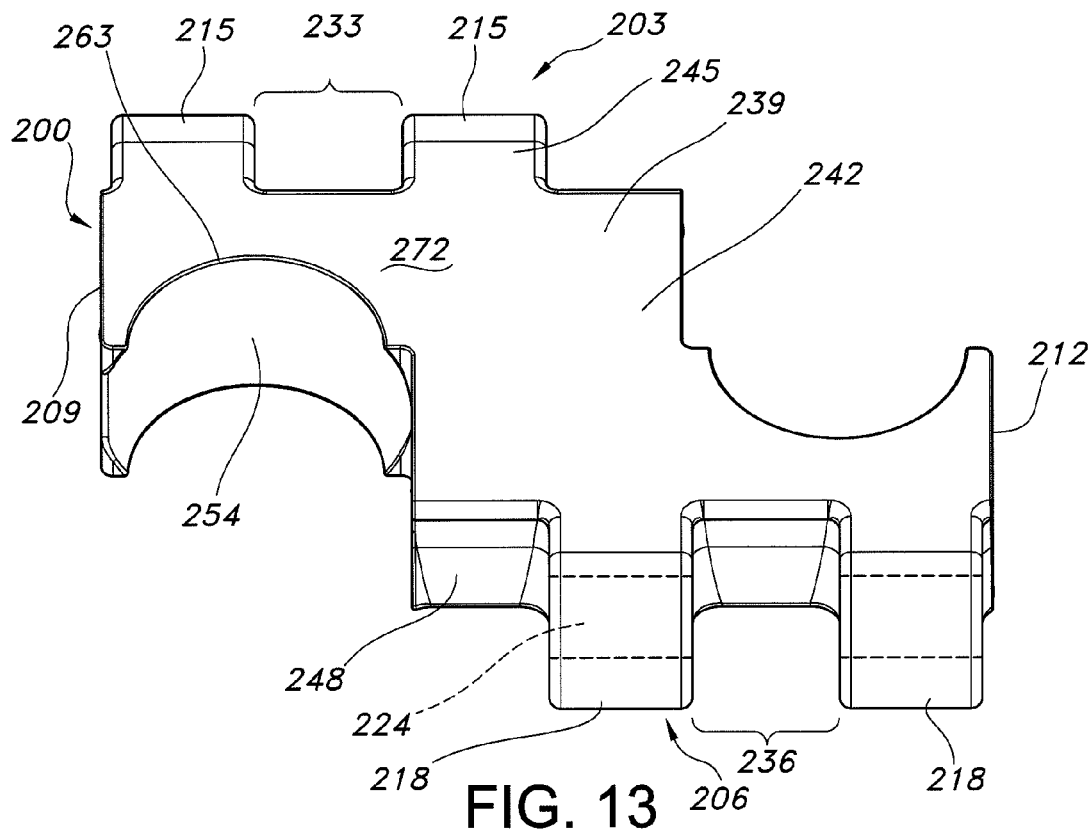
FIG. 13, which is a top perspective view of a middle module.

Turning to FIGS. 13 and 14, a module 200 has a first end 203 and a second end 206. The module 200 extends from a first side 209 to a second side 212. The module 200 is designed to fit in the midportion of a bricklayed belt 213 (FIG. 18) as will be described in detail herein. The module 200 has a first plurality of link ends 215 extending to the first end 203 and a second plurality of link ends 218 extending in a direction opposite the first link ends 215 and toward the second end 206. The link ends 215, 218 have transverse pivot rod openings 221, 224. The transverse pivot rod openings 221 extend from a first side 227 of the link end 215 to a second side 230 of the link end 215. The link ends 215 have spaces 233 between them, and the link ends 218 have spaces 236 between them. The spaces 233 are sized to receive the second link ends 218 from an adjacent row of the belt 213 (See FIG. 18). The first and second link ends 215, 218 are offset such that the first link ends 215 of a first module 200 align with the spaces 236 between the second link ends 218 of an adjacent module 200 in the next row. When the transverse pivot rod openings 221,224 are placed in alignment and pivot rods 229 (FIG. 18) are inserted through the openings 221,224 to connect adjacent rows of modules 200 such that an endless belt 213 (FIG. 18) with pivotally connected rows of modules 200 is formed.

Figure 15:
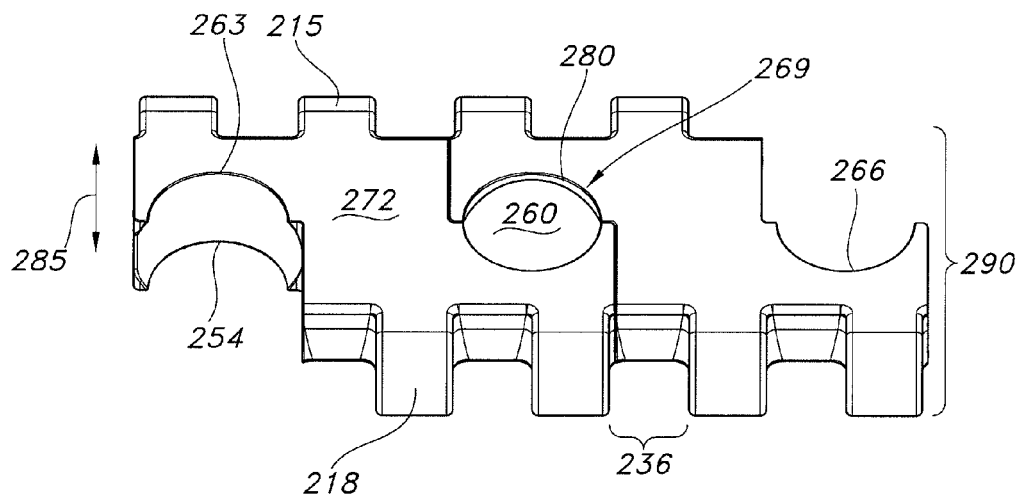
FIG. 15, which is a top perspective view of a midportion of the belt with a sphere installed therein.

The module 200 includes an intermediate section 239 that extends between the link ends 215, 218 from side to side of the module. The intermediate section 239 may have a solid flat top surface 242. The intermediate section 239 extends to a proximal portion 245 of the link end 215. The intermediate section 239 includes an arcuate surface 248 extending from the top to the bottom of the module. The arcuate surface 248 borders the space 236 between adjacent link ends 218 and provides clearance for the distal portion 251 of an adjacent link end 215 when the adjacent rows of modules 200 pivot about the pivot rod 229. The modules 200 pivot when the belt 213 reaches the end of the run and passes over the sprocket (not shown). As shown on the left hand side of FIG. 13, the intermediate section 239 includes a curved inner wall 254 that extends from the top surface 272 to the bottom surface 273 of the module 200. The curved inner wall 254 combines with a complementary curved inner wall 257 on an adjacent module 200 to form a cavity 259 for receiving a sphere 260 (FIG. 15). The curved inner wall 254 has a top edge 263 that is curved approximately in the shape of a semicircle. The top edge 263 combines with the top edge 266 of the adjacent module 200 to form a circular opening 269 (FIG. 15) having a diameter that is less than the diameter of the sphere 260. Accordingly, when a sphere 260 is installed in the cavity 269 formed between adjacent modules 200, the top edges 263, 266 of the curved walls 254, 257 of the two modules 200 retains the sphere 260 in place in the module 200. A portion of the sphere 260 extends above the top surface 272 of the modules 200 to make rolling contact with an item supported by the belt 213.

In FIG. 14, the bottom side of the module 200 includes a cavity 270 sized for engagement with a tooth on the sprocket. On the right hand of the figure, the curved wall 257 for forming one half of the cavity 259 for receiving the sphere 260 is shown. The curved wall 257 extends to the bottom surface 273 of the module 200 where a curved edge 276 forms a portion of the bottom surface 273 of the module 200 and provides one half of a circular opening 280 that is formed when another module 200 is connected to the module 200 shown. The circular opening 280 formed by juxtaposition of the modules 200 has a diameter that is less than the diameter of the spheres 260 such that the sphere is retained within the cavity. A portion of the sphere 260 may extend beyond the circular opening 280 in the bottom surface 274 (best shown in FIG. 16) such that the sphere 260 may be driven from underneath the belt 213 by a roller, another belt, a rotating disc, or the like.

Turning to FIG. 15, a pair of modules 200 are joined together and a sphere 260 is disposed in the cavity 259 formed by the adjacent modules 200. As shown each module 200 has approximately semi-circular edges 263, 266 extending to the top surface 272 in the intermediate section 239 on each side of the module 200. When the modules 200 are joined side-by-side as shown in the figure, the two semicircular curved edges 263, 266 come together to form a circular opening 269 in the top surface 272 of the belt 213. A portion of the sphere 260 extends above the top surface 272 of the belt 213 and is capable of making rolling contact with an item on the top surface 272 of the belt 213. The sphere 260 is installed in the belt 213 by placing it in the cavity 259 formed by the curved walls 254, 257 when they are disposed in facing relation. When the adjacent modules 200 are connected by inserting pivot rods 229 through the aligned transverse openings 221, 224, the position of the adjacent modules 200 in the direction of belt travel indicated by arrow 285 is somewhat fixed and the sphere 260 is securely held in the cavity 259 formed between adjacent modules 200.

Figure 16:
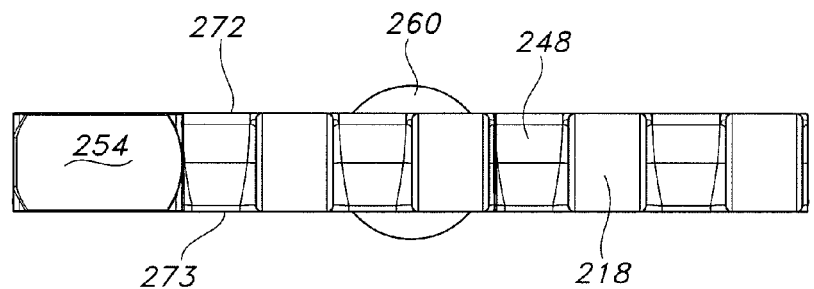
FIG. 16, which is a front elevational view of the portion of the belt shown in FIG. 15.

As shown in FIG. 16, the sphere 260 may be arranged such that it extends above and below the top and bottom surfaces 272, 273 of the module 200. The top of the sphere 260 may be disposed in rolling contact with items transported on the top surface 272 of the belt 213. The sphere 260 may also engage with a roller, a belt, or other device disposed underneath the portion of the belt 213 shown in the figure. In this manner the sphere 260 can be rotated from underneath the belt 213 to move the items on the top surface of the belt in different directions, i.e., side-to-side or the like.

Figure 17:
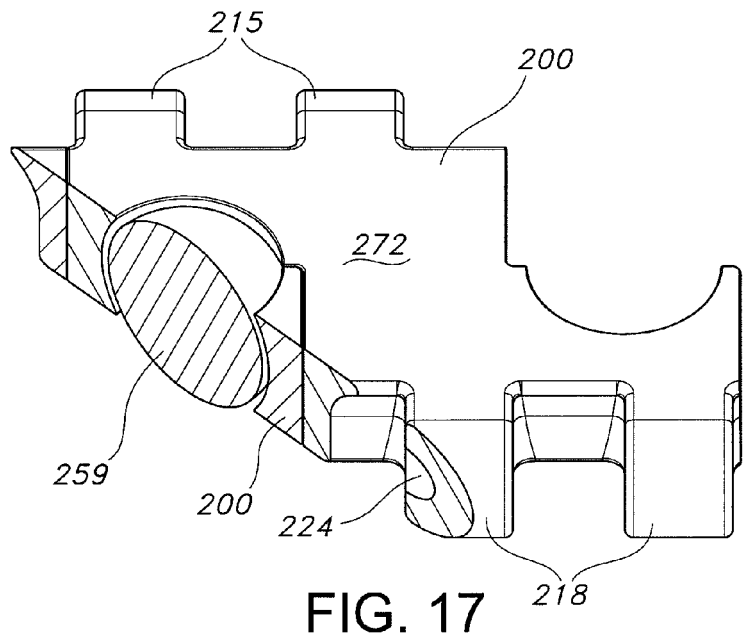
FIG. 17, which is a top perspective view of a portion of the belt with a cutaway section; and, FIG. 18, which is a top plan view of a belt according to the present invention with spheres installed therein.

Turning to FIG. 17, a sectional view of a pair of modules 200 joined to form a cavity 259 is shown. The curved walls 254, 257 of the modules and the circular opening create the cavity 259 for retaining the sphere 260 within the juxtaposed modules 200. By placing a like module 200 next to a module 200 and inserting a pivot rod 229, a row 290 (FIG. 18) of modules 200 with cavities 259 containing spheres 260 is formed.

Figure 18:
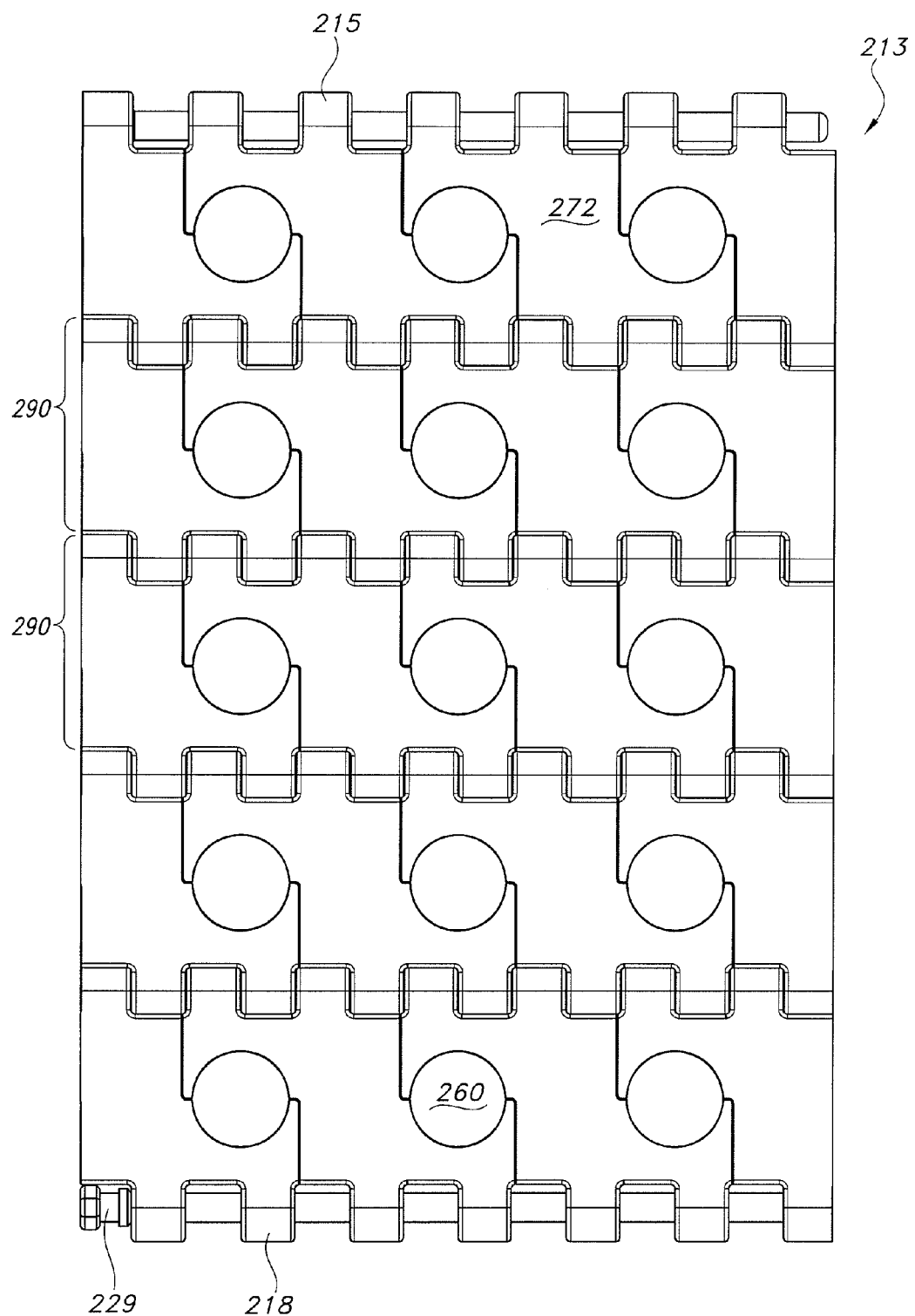

In FIG. 18, the rows 290 of modules 200 can be assembled into a belt 213. The belt 213 has a plurality of rows capable of articulating about a sprocket. The rows pivot by means of pivot rods that are inserted through the aligned transverse pivot rod openings formed by intercalating the link ends of modules disposed on adjacent rows.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A belt module, comprising:
    an intermediate section having a top surface and a bottom surface;
    a first plurality of link ends extending from the intermediate section in a first direction;
    a second plurality of link ends extending from the intermediate section in a second direction opposite to the first direction;
    a first curved wall disposed in the intermediate section, the first curved wall extending from the top surface to the bottom surface and forming a first opening facing in the direction of the first link ends;
    a second curved wall disposed in the intermediate section, the second curved wall extending from the top surface to the bottom surface and forming a second opening facing in a direction opposite to the first opening; and
    wherein the first opening does not adjoin the second opening.

2. The module of claim 1, wherein the first and second link ends have transverse pivot rod openings defined therein.

3. The module of claim 1, wherein the first link ends are offset from the second link ends.

4. The module of claim 1, wherein the first link ends are disposed in spaced apart relation such that a space is defined between successive first link ends.

5. The module of claim 4, wherein the space between link ends is bordered by a curved wall.

6. The module of claim 1, wherein the bottom surface has a recessed portion sized to receive a tooth on a sprocket.

7. A belt module for a modular belt, the belt module comprising:
    an intermediate section having a top surface and a bottom surface;
    a first plurality of link ends extending from the intermediate section in a first direction, the first link ends having a pair of walls defining a transverse thickness, the first link ends having an opening extending between the pair of walls to form a transverse pivot rod opening;
    a second plurality of link ends extending from the intermediate section in a second direction opposite from the first direction, the second link ends having a pair of walls defining a transverse thickness, the second link ends having an opening extending between the pair of wall to form a transverse pivot rod opening, the second link ends offset from the first link ends;
    a first curved wall disposed in the intermediate section, the first curved wall extending from the top surface to the bottom surface and forming a first opening facing in the direction of the first link ends; and
    a second curved wall disposed in the intermediate section, the second curved wall extending from the top surface to the bottom surface and forming a second opening facing in a direction opposite to the first opening;
    wherein the module is capable of being connected to a like module such that the first curved wall and the second curved wall of an adjacent module form a cavity with a curved opening to the top surface of the module.

8. The module of claim 7, wherein a sphere is disposed in the cavity.

9. A modular belt, comprising:
    a plurality of modules having an intermediate section having a top surface and a bottom surface, a first plurality of link ends extending from the intermediate section in a first direction, a second plurality of link ends extending from the intermediate section in a second direction opposite to the first direction, a first curved wall disposed in the intermediate section, the first curved wall extending from the top surface to the bottom surface and forming a first opening facing in the direction of the first link ends, a second curved wall disposed in the intermediate section, the second curved wall extending from the top surface to the bottom surface and forming a second opening facing in a direction opposite to the first opening, wherein the modules are connected end-to-end by pivot rods such that the first curved wall of a first module and the second curved wall of an adjacent module form a cavity; and
    at least one sphere disposed in one of the cavities formed by the modules.

10. The belt of claim 9, wherein the first and second link ends have transverse pivot rod openings defined therein.

11. The belt of claim 9, wherein the first link ends are offset from the second link ends.

12. The belt of claim 9, wherein the first link ends are disposed in spaced apart relation such that a space is defined between successive first link ends.

13. The belt of claim 12, wherein the space between link ends is bordered by a curved wall.

14. The belt of claim 9, wherein the bottom surface of the module has a recessed portion sized to receive a tooth on a sprocket.

15. A method of forming a roller belt comprising:
    providing a plurality of modules having an intermediate section having a top surface and a bottom surface, a first plurality of link ends having transverse pivot rod openings and extending from the intermediate section in a first direction, a second plurality of link ends having transverse pivot rod openings and extending from the intermediate section in a second direction opposite to the first direction, the first link ends offset from the second link ends, a first curved wall disposed in the intermediate section, the first curved wall extending from the top surface to the bottom surface and forming a first opening facing in the direction of the first link ends, a second curved wall disposed in the intermediate section, the second curved wall extending from the top surface to the bottom surface and forming a second opening facing in a direction opposite to the first opening, wherein the modules are connected end-to-end by pivot rods such that the first curved wall of a first module and the second curved wall of an adjacent module form a cavity;

connecting the modules in rows by installing a pivot rod through intercalated link ends, the modules arranged within a row such that the first curved wall of a first module and the second curved wall of an adjacent module form a cavity; and placing a sphere in the cavity formed between the first and second curved walls of adjacent modules.

* * * * *